United States Patent
Lee et al.

(10) Patent No.: US 10,711,719 B2
(45) Date of Patent: Jul. 14, 2020

(54) APPARATUS AND METHOD OF CONTROLLING CATALYST ACTIVATION DURING COLD START OF VEHICLE

(71) Applicants: Hyundai Motor Company, Seoul (KR); Kia Motors Corporation, Seoul (KR)

(72) Inventors: Hyokyung Lee, Anyang-si (KR); Cheol Beom Lim, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 186 days.

(21) Appl. No.: 15/793,703

(22) Filed: Oct. 25, 2017

(65) Prior Publication Data

US 2018/0163651 A1  Jun. 14, 2018

(30) Foreign Application Priority Data

Dec. 12, 2016 (KR) ......................... 10-2016-0168893

(51) Int. Cl.
  *F02D 41/02* (2006.01)
  *F01N 3/10* (2006.01)
  (Continued)

(52) U.S. Cl.
  CPC ......... *F02D 41/0235* (2013.01); *F01N 3/101* (2013.01); *F01N 9/00* (2013.01);
  (Continued)

(58) Field of Classification Search
  CPC . F01N 11/00; F01N 3/101; F01N 9/00; F01N 2430/08; F01N 2550/02; F01N 2900/1404; F01N 2900/1602; F01N 2900/1626; F02D 41/0235; F02D 41/0255; F02D 2200/08; F02P 5/1506; Y02A 50/2324; Y02T 10/22; Y02T 10/26; Y02T 10/46; Y02T 10/47
  (Continued)

(56) References Cited

U.S. PATENT DOCUMENTS 4,574,588 A * 3/1986 Hayama ............. F02D 35/0015
                                                  60/284
5,877,413 A * 3/1999 Hamburg ............. F01N 11/007
                                                  60/277
(Continued)

FOREIGN PATENT DOCUMENTS

| JP | 3323223 B2 | 9/2002 |
| JP | 2007-040264 A | 2/2007 |
| JP | 2008-267294 A | 11/2008 |

OTHER PUBLICATIONS

Machine Translation JP 2008-267294 (Year: 2019).*

*Primary Examiner* — Thai Ba Trieu
*Assistant Examiner* — Dapinder Singh
(74) *Attorney, Agent, or Firm* — Morgan, Lewis & Bockius LLP

(57) ABSTRACT

A method of controlling activation of light off time of a catalyst which controls exhaust emission from an engine of a vehicle may include determining whether the vehicle is in a cold start condition; determining a deterioration level of the catalyst by use of a temperature sensor; and retarding a spark timing according to the deterioration level of the catalyst and increasing a temperature of exhaust gas.

12 Claims, 4 Drawing Sheets

(51) Int. Cl.
*F01N 9/00* (2006.01)
*F01N 11/00* (2006.01)
*F02P 5/15* (2006.01)

(52) U.S. Cl.
CPC .......... *F01N 11/00* (2013.01); *F02D 41/0255* (2013.01); *F02P 5/1506* (2013.01); *F01N 2430/08* (2013.01); *F01N 2550/02* (2013.01); *F01N 2900/1404* (2013.01); *F01N 2900/1602* (2013.01); *F01N 2900/1626* (2013.01); *F02D 2200/08* (2013.01); *Y02A 50/2324* (2018.01); *Y02T 10/22* (2013.01); *Y02T 10/26* (2013.01); *Y02T 10/46* (2013.01); *Y02T 10/47* (2013.01)

(58) Field of Classification Search
USPC .......................... 60/274, 277, 286, 295, 299
See application file for complete search history.

(56) References Cited

U.S. PATENT DOCUMENTS

| | | | | |
|---|---|---|---|---|
| 6,050,128 A * | 4/2000 | Hamburg | ............... | F01N 11/007 60/274 |
| 6,131,439 A * | 10/2000 | Hamburg | ............... | F01N 11/007 60/276 |
| 7,707,821 B1 * | 5/2010 | Legare | .................... | F01N 3/101 60/277 |
| 7,886,523 B1 * | 2/2011 | Legare | .................. | F02D 41/008 60/274 |
| 8,863,497 B1 * | 10/2014 | Legare | .................. | F02D 41/008 60/274 |

\* cited by examiner

APPARATUS AND METHOD OF CONTROLLING CATALYST ACTIVATION DURING COLD START OF VEHICLE

CROSS-REFERENCE TO RELATED APPLICATION

The present application claims priority to Korean Patent Application No. 10-2016-0168893 filed on Dec. 12, 2016, the entire contents of which is incorporated herein for all purposes by this reference.

BACKGROUND OF THE INVENTION

Field of the Invention

The present invention relates to an apparatus and a method of controlling catalyst activation, and more particularly, to an apparatus and a method of controlling catalyst activation during cold start of a vehicle, which retards a spark timing according to a deterioration level of a catalyst.

Description of Related Art

In general, exhaust gas emitted from an engine of a vehicle contains a large amount of ingredients, such as CO, HC, and NOx, harmful to a human body, so that when the harmful ingredients are emitted to the air as they are, atmospheric pollution is caused.

In this respect, an exhaust gas post-processing system for purifying harmful materials in exhaust gas is provided in a vehicle, and in the exhaust gas post-processing system, a catalyst device is installed in a middle of an exhaust pipe and harmful ingredients in the exhaust gas are purified by a catalytic action.

In the meantime, in order for the catalyst device to exert a purification function, the activation of the catalyst needs to be performed, and it is known that an activation temperature, at which the catalyst exerts its own function, needs to reach about 300 to 400° C. or more.

However, in a cold state of a start initial stage of an engine, a temperature of the exhaust gas is low and a temperature of cooling water is low, so that it takes some time until the catalyst is heated and reaches the activation temperature.

Accordingly, in the cold start state of the vehicle, the catalyst device cannot exert its own function and the large amount of exhaust gas, which is not purified by the catalyst device, is emitted, so that the non-purified exhaust gas is a main factor of atmospheric pollution.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an apparatus and a method of controlling catalyst activation, which retards a spark timing according to the degree of deterioration of a catalyst, increase a temperature of the catalyst, and secure catalyst performance. Various aspects of the present invention are directed to providing a method of controlling activation of light off time of a catalyst which controls exhaust emission from an engine of a vehicle, the method including: determining whether the vehicle is in a cold start condition; determining a deterioration level of the catalyst by use of a temperature sensor; and retarding a spark timing according to the deterioration level of the catalyst and increasing a temperature of exhaust gas.

The deterioration level of the catalyst may be determined by Equation 1 below.

$$\text{Catalyst deterioration level} = S \exp(R/T_i) \times t_i \qquad \text{[Equation 1]}$$

Herein, R is a catalyst thermal reaction coefficient, Ti is a catalyst intermediate temperature, and ti is a time.

When the deterioration level of the catalyst is high, the spark ignition timing retard value may be increased.

The temperature of the exhaust gas may be increased by increasing the spark ignition timing retard value.

The spark ignition timing retard value may be increased to a time after a maximum torque of the engine is represented.

The cold start condition may be an engine idle condition and a part-load condition.

The catalyst may be a three-way catalyst (TWC). The vehicle may include a gasoline vehicle.

Various aspects of the present invention are directed to providing an apparatus for controlling activation of light off time of a catalyst, the apparatus including: an exhaust system, which emits exhaust gas generated in an engine; a catalytic converter, which supplies a catalyst to the exhaust system; and a controller, which determines whether the vehicle is in a cold start condition, determines a deterioration level of the catalyst by use of a temperature sensor, and retards a spark timing according to the deterioration level of the catalyst and increases a temperature of exhaust gas.

The deterioration level of the catalyst may be determined by Equation 1 below.

$$\text{Catalyst deterioration level} = S \exp(R/T_i) \times t_i \qquad \text{[Equation 1]}$$

Herein, R is a catalyst thermal reaction coefficient, Ti is a catalyst intermediate temperature, and ti is a time.

When the deterioration level of the catalyst is high, the controller may increase the spark ignition timing retard value.

The controller may increase the temperature of the exhaust gas by increasing the spark ignition timing retard value.

The controller may increase the spark ignition timing retard value to a time after a maximum torque of the engine is represented.

The cold start condition may be an engine idle condition and a part-load condition.

The catalytic converter may include a three-way catalyst. The vehicle may include a gasoline vehicle.

According to the method and the apparatus for controlling catalyst activation according to the exemplary embodiment of the present invention, a spark ignition timing retard value is changed by reflecting a deterioration characteristic of a catalyst including a TWC, improving exhaust gas purifying performance of the catalyst.

A spark ignition timing retard value is increased to a time after a maximum torque of the engine is represented during the cold start, so that it is possible to secure a sufficient catalyst temperature, suppressing (or minimizing) a discharge (EM slip) of exhaust gas.

Simultaneously, it is possible to minimize a loss of fuel efficiency.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
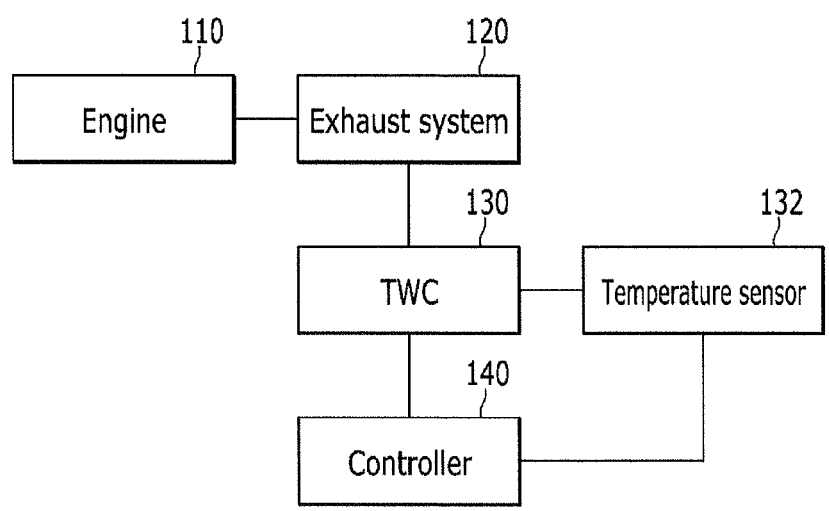
FIG. 1 is a schematic block diagram of a catalyst activation control apparatus according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings so that those skilled in the art may easily practice the present invention. As those skilled in the art would realize, the described embodiments may be modified in various different ways, all without departing from the spirit or scope of the present invention.

In addition, in various exemplary embodiments, the same reference numerals are used in respects to the constituent elements having the same constitution and representatively illustrated in an exemplary embodiment, and in the other exemplary embodiment, only constitution that is different from the exemplary embodiment will be described.

It is noted that the drawings are schematic and are not dimensionally illustrated. Relative dimensions and ratios of portions of the drawings are exaggerated or reduced in size for clarity and convenience in the drawings, and a predetermined dimension is only illustrative but not limitative. In addition, the same reference numerals designate the same structures, elements, or parts illustrated in the two or more drawings to exhibit similar characteristics. It will be understood that when an element is referred to as being "on" or "over" another element, it can be directly on the other element or intervening elements may also be present.

An exemplary embodiment of the present invention specifically represents one exemplary embodiment of the present invention. As a result, various modifications of the illustration are expected. Accordingly, the exemplary embodiment is not limited to a specific form of an illustrated region, and for example, includes a modification of a form by manufacturing.

Hereinafter, a catalyst activation control apparatus and method according to an exemplary embodiment of the present invention will be described with reference to FIG. 1.

FIG. 1 is a schematic block diagram of a catalyst activation control apparatus according to an exemplary embodiment of the present invention.

Referring to FIG. 1, the catalyst activation control apparatus according to the exemplary embodiment of the present invention includes an exhaust system 120, a catalytic converter 130, a temperature sensor 132, and a controller 140.

The exhaust system 120 discharges exhaust gas generated in an engine 110, and the catalytic converter 130 supplies a catalyst to the exhaust system 120. The catalytic converter 130 is provided with a temperature sensor 132, which detects a temperature of the catalyst.

The engine 110 may be a Continuous Variable Valve Timing (CVVT) engine, a double over head camshaft (DOHC) engine, a continuous valve timing (CVT) engine, a gasoline direct injection (GDI) engine, a multi-point injection (MPI) engine, and the like, which use gasoline as fuel.

As a matter of course, in addition to the gasoline engine, the exemplary embodiment of the present invention is applicable to an engine using diesel as fuel, an engine using gas as fuel, and the like.

The exhaust system 120 is an exhaust muffler discharging discharged gas generated in the engine, but in addition to the exhaust muffler, the exhaust system 120 may be formed of a manifold, a catalyzer, and the like.

The catalytic converter 130 includes a catalyst oxidation-reduction reacted with exhaust gas, a heater heating the catalyst, and the like. The catalytic converter 130 may include a three-way catalyst (TWC).

The controller 140 determines a cold start condition, and determines a deterioration level of the catalyst by use of the temperature of the catalyst detected by the temperature sensor 132.

When a mileage is increased, performance of the catalyst is gradually degraded, and this refers to deterioration of the catalyst, and the deterioration of the catalyst may be generated by chemical deactivation and thermal deactivation. In the case of a gasoline catalyst, the main reason of the deterioration is a thermal deterioration by an exposure to a high temperature, and an activation temperature (light-off temperature (LOT)) is increased and conversion efficiency is decreased by the deterioration.

The controller 140 retards a spark timing according to the deterioration level of the catalyst and increases a temperature of the exhaust gas.

The controller 140 may increase the spark ignition timing retard value when the deterioration level of the catalyst is high, and may increase a temperature of the exhaust gas by increasing the spark ignition timing retard value. Further, the controller 140 may increase the spark ignition timing retard value to a time after a maximum torque of the engine is represented.

Figure 2:
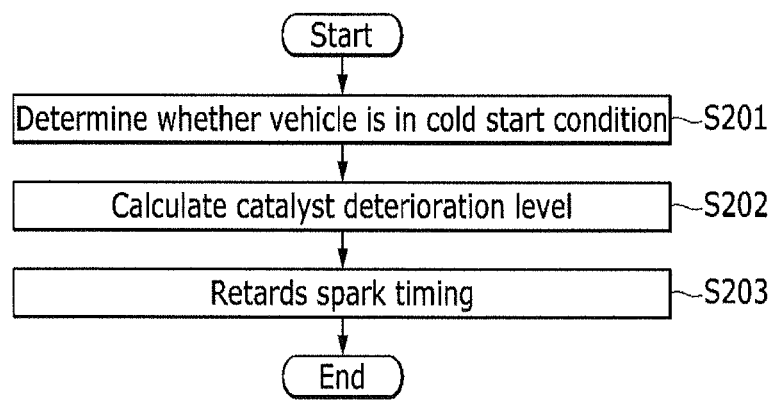
FIG. 2 is a flowchart illustrating a catalyst activation control method according to an exemplary embodiment of the present invention.
Figure 3:
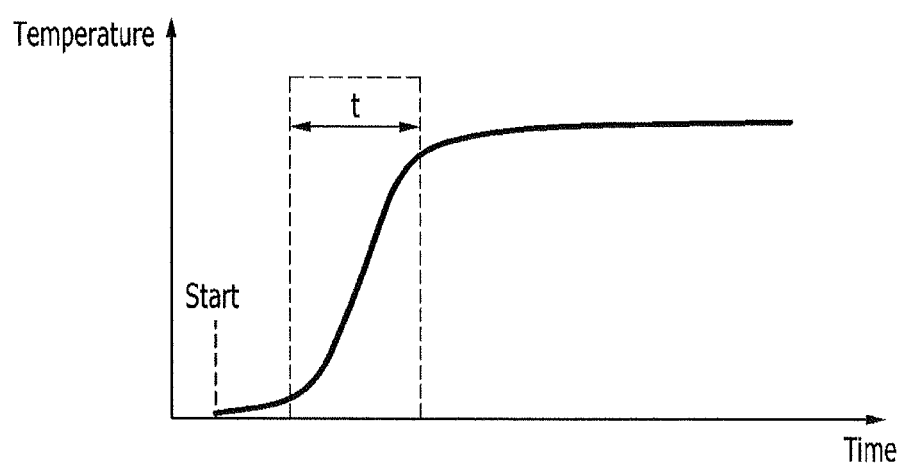
FIG. 3 is a graph representing an example, in which a spark ignition timing level is retarded to increase a temperature of exhaust gas in the catalyst activation control method according to the exemplary embodiment of the present invention.
Figure 4:
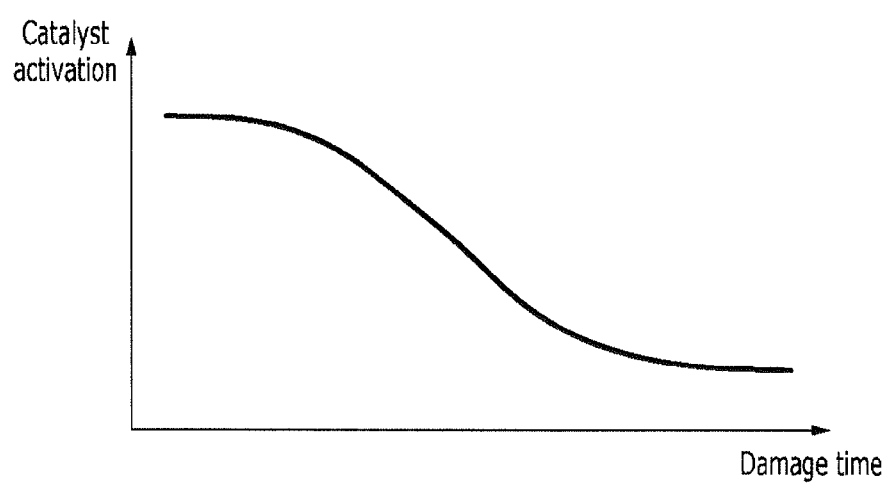
FIG. 4 is a graph representing a change in a catalyst deterioration level according to time in the catalyst activation control method according to the exemplary embodiment of the present invention.

FIG. 2 is a flowchart illustrating a catalyst activation control method according to an exemplary embodiment of the present invention, FIG. 3 is a graph representing an example, in which an ignition timing level is retarded to increase a temperature of exhaust gas in the catalyst activation control method according to the exemplary embodiment of the present invention and FIG. 4 is a graph representing a change in a catalyst deterioration level according to time in the catalyst activation control method according to the exemplary embodiment of the present invention.

Referring to FIG. 2, in the catalyst activation control method according to the exemplary embodiment of the present invention, first, whether a vehicle is in a cold start condition is determined (S201). The cold start condition may be an engine idle condition and a part-load condition.

In the cold start condition, a temperature of exhaust gas is low, so that discharged gas from the engine is not purified by the catalytic converter, and thus it is difficult to purity the discharged gas. It is possible to decrease the discharge of carbon monoxide and hydrocarbon in the discharged gas of the engine by minimizing a heating time period in the cold start condition, and it is possible to improve discharged gas purifying performance in the catalytic converter by implementing heating in the part-load condition.

Then, a deterioration level of the catalyst is determined by use of the temperature sensor (S202).

The deterioration level of the catalyst may be determined by Equation 1 below.

$$\text{Catalyst deterioration level} = S\exp(R/Ti) \times ti \quad \text{[Equation 1]}$$

Here, R is a catalyst thermal reaction coefficient, Ti is a catalyst intermediate temperature, and ti is a time.

As illustrated in FIG. 4, when a mileage (ti, damage time) is increased, performance (catalyst activation) of the catalyst is gradually degraded, which represents a deterioration level of the catalyst.

Then, a temperature of exhaust gas is increased by retarding a spark timing according to the deterioration level of the catalyst (S203).

When the deterioration level of the catalyst is high, the spark ignition timing retard value is increased, and the spark ignition timing retard value is increased, so that the temperature of the exhaust gas is increased.

As illustrated in FIG. 3, the temperature of the exhaust gas is increased after the vehicle starts, and a predetermined time is taken until the temperature reaches the catalyst activation temperature. When the deterioration level of the catalyst is high, the spark ignition timing retard value is increased, further increasing the temperature of the exhaust gas. In the instant case, when the spark ignition timing retard value is increased to a time after a maximum torque of the engine is represented, the torque may be decreased and the temperature of the exhaust gas may be further increased. According to the increase in the temperature of the exhaust gas, it is possible to secure a temperature required for activating the catalyst.

As described above, according to the catalyst activation control method and apparatus according to the exemplary embodiment of the present invention, a spark ignition timing retard value is changed by reflecting a deterioration characteristic of a catalyst including a TWC, improving exhaust gas purifying performance of the catalyst.

A spark ignition timing retard value is increased to a time after a maximum torque of the engine is represented during the cold start, so that it is possible to secure a sufficient catalyst temperature, suppressing (or minimizing) a discharge (EM slip) of exhaust gas. Simultaneously, it is possible to minimize a loss of fuel efficiency.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of controlling activation of light off time of a catalyst which controls exhaust emission from an engine of a vehicle, the method comprising:
   determining whether the vehicle is in a cold start condition;
   determining a deterioration level of the catalyst by use of a temperature sensor; and
   retarding a spark timing according to the determined deterioration level of the catalyst and increasing a temperature of exhaust gas,
   wherein, when the deterioration level of the catalyst is higher than a predetermined value, a spark ignition timing retard value is configured to be increased.

2. The method of claim 1,
   wherein the deterioration level of the catalyst is determined by Equation 1 below, $$\text{Catalyst deterioration level} = S\exp(R/Ti) \times ti, \text{ and} \quad \text{[Equation 1]}$$

wherein, R is a catalyst thermal reaction coefficient, Ti is a catalyst intermediate temperature, and ti is a time.

3. The method of claim 1, wherein the spark ignition timing retard value is configured to be increased to a time after a maximum torque of the engine is represented.

4. The method of claim 1, wherein the cold start condition is an engine idle condition and a part-load condition.

5. The method of claim 1, wherein the catalyst is a three-way catalyst (TWC).

6. The method of claim 1, wherein the vehicle includes a gasoline vehicle.

7. An apparatus for controlling activation of light off time of a catalyst, the apparatus comprising:
   an exhaust system, which emits exhaust gas generated in an engine;
   a catalytic converter, which supplies the catalyst to the exhaust system; and
   a controller, which is configured to determine whether the vehicle is in a cold start condition, is configured to determine a deterioration level of the catalyst by use of a temperature sensor, is configured to retard a spark timing according to the determined deterioration level of the catalyst, and is configured to increase a temperature of exhaust gas, wherein, when the deterioration level of the catalyst is higher than a predetermined value, the controller is configured to increase a spark ignition timing retard value.

8. The apparatus of claim 7,
wherein the deterioration level of the catalyst is configured to be determined by Equation 1 below, Catalyst deterioration level=$S$exp($R/Ti$)×$ti$, and [Equation1]

wherein, R is a catalyst thermal reaction coefficient, Ti is a catalyst intermediate temperature, and ti is a time.

9. The apparatus of claim 7, wherein the controller is configured to increase the spark ignition timing retard value to a time after a maximum torque of the engine is represented.

10. The apparatus of claim 7, wherein the cold start condition is an engine idle condition and a part-load condition.

11. The apparatus of claim 7, wherein the catalyst includes a three-way catalyst.

12. The apparatus of claim 7, wherein the vehicle includes a gasoline vehicle.

\* \* \* \* \*